(12) United States Patent
Zhou et al.

(10) Patent No.: US 11,356,026 B2
(45) Date of Patent: Jun. 7, 2022

(54) ELECTRICAL SYSTEM AND METHOD FOR PROTECTING A DC/DC CONVERTER

(71) Applicant: Valeo Siemens eAutomotive France SAS, Cergy (FR)

(72) Inventors: Huan Zhou, Bezons (FR); Gang Yang, Courbevoie (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 78 days.

(21) Appl. No.: 16/906,309

(22) Filed: Jun. 19, 2020

(65) Prior Publication Data
US 2020/0412259 A1    Dec. 31, 2020

(30) Foreign Application Priority Data

Jun. 27, 2019    (FR) ..................................... 1907063

(51) Int. Cl.
*H02M 3/335*    (2006.01)
*H02M 3/00*    (2006.01)
*H02M 1/32*    (2007.01)
*H02M 1/00*    (2006.01)

(52) U.S. Cl.
CPC ......... *H02M 3/33569* (2013.01); *H02M 1/32* (2013.01); *H02M 3/01* (2021.05); *H02M 1/0058* (2021.05); *H02M 3/335* (2013.01)

(58) Field of Classification Search
CPC ...... H02M 3/33569; H02M 1/32; H02M 3/01; H02M 1/0058; H02M 3/335; H02M 1/325; H02M 3/337; Y02B 70/10; H02J 7/342; H02J 2207/20
See application file for complete search history.

(56) References Cited

U.S. PATENT DOCUMENTS

2011/0255321 A1    10/2011    Figge et al.
2020/0091837 A1*   3/2020    Krumpholz ......... H02M 7/5387

FOREIGN PATENT DOCUMENTS

CN    207518331 U    6/2018

OTHER PUBLICATIONS

Search Report from French Intellectual Property Office on corresponding FR application (FR1907063) dated Feb. 14, 2020.

* cited by examiner

*Primary Examiner* — Kyle J Moody
(74) *Attorney, Agent, or Firm* — Klein, O'Neill & Singh LLP

(57) ABSTRACT

An electrical system having, among other things, a resonant DC-DC voltage converter with two resonant capacitors, a control unit having a first module for determining a maximum value and a minimum value of the voltage at the terminals of each resonant capacitor as a function of an output voltage of the converter, a module for comparing between the maximum value and respectively a minimum value of the voltage at the terminals of each resonant capacitor and a failure detection element configured to detect a failure of the converter if the maximum value is greater than or equal to the upper voltage limit, or the minimum value is less than or equal to the lower voltage limit.

11 Claims, 7 Drawing Sheets

ELECTRICAL SYSTEM AND METHOD FOR PROTECTING A DC/DC CONVERTER

TECHNICAL FIELD OF THE INVENTION

The present invention relates to the field of systems for supplying electrical and/or electronic equipment notably configured to be on board an automobile vehicle, in particular an electric or hybrid automobile vehicle. The present invention more particularly relates to the field of DC-DC converters, that is to say electrical systems making it possible to convert a direct current input voltage into a direct current output voltage, less than or greater than the input voltage.

In a known manner, an electric or hybrid automobile vehicle comprises an electrical motorisation system, supplied by a high voltage power supply battery via an on board high voltage electrical network, and various auxiliary items of electrical equipment, supplied by a low voltage power supply battery via an on board low voltage electrical network.

BACKGROUND

FIG. 1 represents a functional block diagram of an on board electrical system of the prior art. Thus, the high voltage power supply battery HV ensures a function of supplying the electric motorisation system ENG with energy enabling the propulsion of the vehicle. The low voltage power supply battery LV supplies the auxiliary items of electrical equipment AUX, such as on board computers, window winder motors, a multimedia system, etc. The high voltage power supply battery HV typically delivers a voltage comprised between 100 V and 900 V, preferably between 100 V and 500 V, whereas the low voltage power supply battery LV typically delivers a voltage of the order of 12 V, 24 V or 48 V. These two high and low voltage power supply batteries HV and LV must be able to be charged.

The recharging of the high voltage power supply battery HV with electrical energy is carried out in a known manner by connecting it, via an electric charger OBC of the vehicle, to an external electrical supply network, for example the domestic AC electrical network G1. Finally, still with reference to FIG. 1, the charging of the low voltage power supply battery LV is carried out in a known manner by the high voltage power supply battery HV. The system comprises for this purpose a DC-DC converter DC10, connected between the high voltage power supply battery HV and the low voltage power supply battery LV.

Typically, the electric charger OBC comprises an isolated DC-DC converter. A resonant converter circuit LLC illustrated in FIG. 2 is known, comprising two resonant capacitors C3, C4, a resonant coil L1 and a transformer Tr. In the case where the output power of the circuit increase, the resonant current of the transformer Tr also increases and, finally, the amplitude of the voltage Vr at the terminals of each resonant capacitor C3, C4 increases. When the variations in amplitude of voltage Vr are too high, they can cause overcharging in the resonant capacitors C3 and C4 and at the output of the converter circuit LLC.

In a known manner, with reference to FIG. 3, to avoid potential deterioration of the converter circuit LLC following an overcharge, it necessary to protect the resonant capacitors C3 and C4 by limiting the voltage at their respective terminals. To do so, a first solution consists in placing so-called "ultra-rapid" diodes D3, D4, designating diodes that switch at very high frequency as in the present case at more than 275 kHz, in parallel with the resonant capacitors C3 and C4. Thus, when the voltage Vr is positive, the diode is non-conducting, but when the voltage Vr is negative, the diode is conducting and short-circuits the resonant capacitor. This thus prevents overcharging of the resonant capacitors C3 and C4.

This solution has drawbacks, notably the high cost of these ultra-rapid diodes, knowing that two are needed per circuit. Furthermore, the two ultra-rapid diodes cannot short-circuit at the same time. Finally, the limit voltage for short-circuiting by the diode is not adjustable since it is intrinsic to the diode.

To overcome these drawbacks, the present invention proposes an electrical system configured to use a method for detecting overcharging of the resonant capacitor, based on a current measurement.

SUMMARY OF THE INVENTION

More precisely, the invention relates to an electrical system enabling the conversion of a direct current voltage into another direct current voltage, comprising:
  a resonant DC-DC voltage converter comprising a resonant converter circuit LLC comprising a resonant inductor, two resonant capacitors and a transformer,
  a control unit comprising:
    a first module for determining a maximum voltage value at the terminals of each resonant capacitor and a minimum voltage value at the terminals of each resonant capacitor as a function of an output voltage of the resonant DC-DC voltage converter,
    a module for comparing between said maximum voltage value at the terminals of each resonant capacitor and an upper voltage limit corresponding to said output voltage and between said minimum voltage value at the terminals of each resonant capacitor and a lower voltage limit corresponding to said output voltage,
    a failure detection element configured to detect a failure of the resonant DC-DC voltage converter if:
      said maximum voltage value at the terminals of each resonant capacitor is greater than or equal to the upper voltage limit, or
      said minimum voltage value at the terminals of each resonant capacitor is less than or equal to the lower voltage limit.

Advantageously, by detecting a failure of the resonant DC-DC voltage converter, the electrical system detects an overcharge of the resonant capacitors.

Preferably, the resonant DC-DC voltage converter of the electrical system comprises a rectifier, connected at the level of the secondary of the transformer.

Advantageously, the rectifier makes it possible to convert a square wave AC voltage into a pulsed rectified voltage, that is to say a variable voltage but of constant sign.

Preferably, the electrical system comprises a second determination module, configured to determine the average value of the output current, from a measurement point situated at an output terminal of the rectifier, notably a lower output terminal of the rectifier.

Advantageously, the first determination module of the electrical system is configured to determine the maximum voltage value at the terminals of each resonant capacitor and the minimum voltage value at the terminals of each resonant capacitor from the input voltage of the resonant DC-DC voltage converter, the average value of the output current, the switching frequency of the resonant DC-DC voltage converter, the value of the resonant capacitors, the value of the output voltage of the rectifier, the transformation ratio of the transformer and the primary magnetising inductor of the transformer.

Preferably, the first determination module of the electrical system is configured to:

determine the maximum voltage value at the terminals of each resonant capacitor according to the formula:

$$V_{r\_max} = \frac{1}{2}V_{in} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 1]

and to determine the minimum voltage value at the terminals of each resonant capacitor according to the formula:

$$V_{r\_min} = \frac{1}{2}V_{in} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 2]

where $V_{in}$ is the input voltage of the resonant DC-DC voltage converter, $C_r$ is the value of the resonant capacitors, $F_s$ is the switching frequency of the resonant DC-DC voltage converter, N designates the transformation ratio of the transformer, $I_{s\_avg}$ is the average value of the output current, $V_{out}$ is the output voltage and $L_m$ designates the primary magnetising inductor of the transformer.

Preferably, the module for comparing the electrical system is configured such that:

said upper voltage limit corresponds to a maximum voltage value allowed at the terminals of each resonant capacitor, notably above which said capacitor is in overcharge, and said lower voltage limit corresponds to a minimum voltage value allowed at the terminals of each resonant capacitor, notably below which said resonant capacitor is in overcharge.

Advantageously, the module for comparing the electrical system, via the comparisons made, makes it possible to detect potential overcharging of the resonant capacitors.

The invention also relates to a method for detecting overcharging of a resonant DC-DC voltage converter implemented in an electrical system comprising a resonant DC-DC voltage converter comprising a resonant converter circuit LLC which comprises a resonant inductor, two resonant capacitors and a transformer, said method being characterised in that it comprises the steps of:

determination of an output voltage of the resonant DC-DC voltage converter, determination of a maximum voltage value at the terminals of each resonant capacitor and a minimum voltage value at the terminals of each resonant capacitor as a function of an output voltage of the resonant DC-DC voltage converter, comparison between an upper voltage limit and the maximum voltage value at the terminals of each resonant capacitor and between a lower voltage limit and the minimum voltage value at the terminals of each resonant capacitor, detection of a failure of the resonant DC-DC voltage converter if said maximum voltage value at the terminals of each resonant capacitor is greater than or equal to the upper voltage limit, and/or if said minimum voltage value at the terminals of each resonant capacitor is less than or equal to the lower voltage limit.

In an alternative, the method comprises the steps of:

determination, notably measurement, of the output current, determination of the average value of said output current over a period referred to as "evaluation period", determination of the maximum voltage value at the terminals of each resonant capacitor and the minimum voltage value at the terminals of each resonant capacitor over the evaluation period, from the average value of the output current, determined at the preceding step, and the output voltage of the electrical system.

Preferably, the failure detection step of the method corresponds to the detection of an overcharge of a resonant capacitor.

Advantageously, after the failure detection step of the method, the method comprises a step of cut-off of the resonant DC-DC voltage converter, wherein the operation of the resonant DC-DC voltage converter is stopped.

Preferably, the method comprises a preliminary phase of calibration wherein said lower voltage limit, respectively said upper voltage limit, is selected from a set of lower voltage limit values, respectively a set of upper voltage limit values, as a function of the output voltage value of the resonant DC-DC voltage converter.

Preferably, during the preliminary phase of calibration of the method, said set of lower voltage limit values is determined by point by point comparison of sets of low voltage values and by selecting the maximum value from among the values of the first, second and third sets of low voltage values for each usual output voltage value, said sets of low voltage values being defined according to the following formula:

$$V_{r\_min(1)} = \frac{1}{2}V_{in(nom)} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 3]

$$V_{r\_min(2)} = \frac{1}{2}V_{in(min)} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 4]

$$V_{r\_min(3)} = \frac{1}{2}V_{in(max)} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 5]

where $V_{in(nom)}$ is the nominal value of the input voltage of the resonant DC-DC voltage converter, $V_{in(min)}=V_{in(nom)}-0.5*\Delta V_{in}$ is the nominal minimum value of the input voltage, $V_{in(max)}=V_{in(nom)}+0.5*\Delta V_{in}$ is the nominal maximum value of the input voltage and $\Delta V_{in}$ represents the undulation around the nominal input voltage value, said set of upper voltage limit values is determined by point by point comparison of sets of high voltage values and by selecting the minimum value from among the values of the first, second and third sets of high voltage values for each usual output voltage value, said sets of high voltage values being defined according to the following formula:

$$V_{r\_max(1)} = \frac{1}{2}V_{in(nom)} + \frac{\sqrt{2}}{C_r 2\pi F_s}\sqrt{\left(N \times I_{S_{avg}} \times \frac{\pi}{2\sqrt{2}}\right)^2 + \left(\frac{V_{out}}{4\sqrt{3} \times N \times F_s \times L_m}\right)^2}$$ [Math 6]

$$V_{r\_max(2)} = \frac{1}{2}V_{in(min)} + \frac{\sqrt{2}}{C_r 2\pi F_s}\sqrt{\left(N \times I_{S_{avg}} \times \frac{\pi}{2\sqrt{2}}\right)^2 + \left(\frac{V_{out}}{4\sqrt{3} \times N \times F_s \times L_m}\right)^2}$$ [Math 7]

$$V_{r\_max(3)} = \frac{1}{2}V_{in(max)} + \frac{\sqrt{2}}{C_r 2\pi F_s}\sqrt{\left(N \times I_{S_{avg}} \times \frac{\pi}{2\sqrt{2}}\right)^2 + \left(\frac{V_{out}}{4\sqrt{3} \times N \times F_s \times L_m}\right)^2}$$ [Math 8]

BRIEF DESCRIPTION OF THE DRAWINGS

The invention will be better understood on reading the description that follows, given uniquely as an example, and by referring to the appended drawings given as non-limiting examples, in which identical references are given to similar objects and in which:

FIG. 1 represents the functional block diagram of an electrical system according to the prior art;

FIG. 2 represents an electronic diagram of an electrical system according to the prior art;

FIG. 3 represents an electronic diagram of an electrical system according to the prior art;

FIG. 4 illustrates the functional block diagram of an electrical system according to the invention;

FIG. 5 illustrates the electronic diagram of the electrical system of FIG. 4;

FIG. 6 illustrates a block diagram representing the method for detecting overcharging according to the invention;

FIG. 7 illustrates a phase of calibration of the method according to an example of the invention, FIG. 8 graphically illustrates first, second and third sets of high voltage values as a function of the output voltage of the DC-DC resonant converter according to an example of the invention;

FIG. 9 graphically illustrates a set of upper voltage limit values as a function of the output voltage of the DC-DC resonant converter according to an example of the invention;

FIG. 10 graphically illustrates first, second and third sets of low voltage values as a function of the output voltage of the DC-DC resonant converter according to an example of the invention;

FIG. 11 graphically illustrates a set of lower voltage limit values as a function of the output voltage of the DC-DC resonant converter according to an example of the invention.

It should be noted that the figures set out the invention in a detailed manner to implement the invention, said figures obviously being able to better define the invention if need be.

DETAILED DESCRIPTION OF THE INVENTION

It is recalled that the present invention is described hereafter by means of different non-limiting embodiments and is capable of being implemented in alternatives within the reach of those skilled in the art, also targeted by the present invention.

Figure 1:
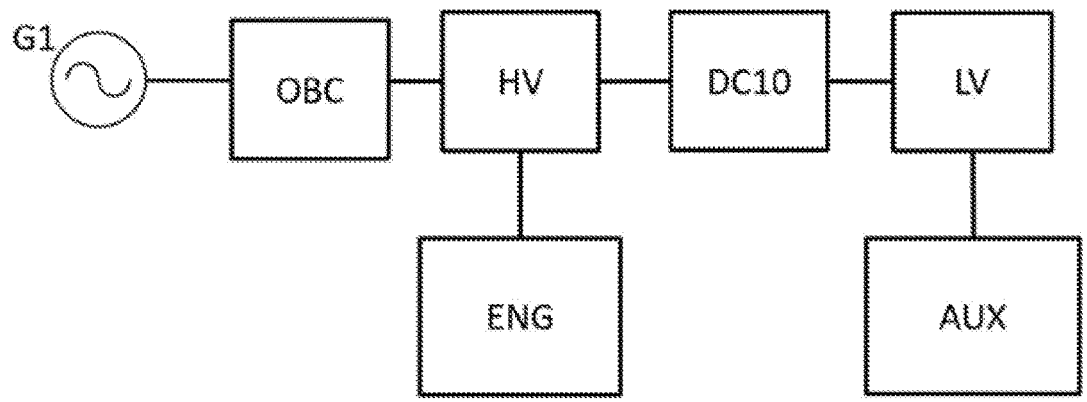
FIG. 1 (already described)
Figure 2:
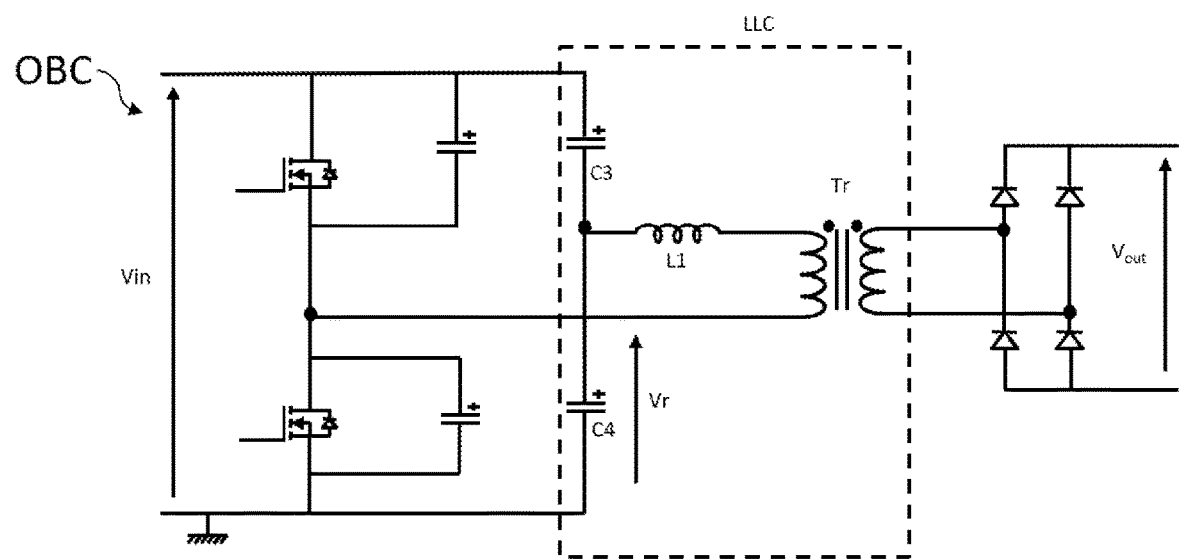
FIG. 2 (already described)
Figure 3:
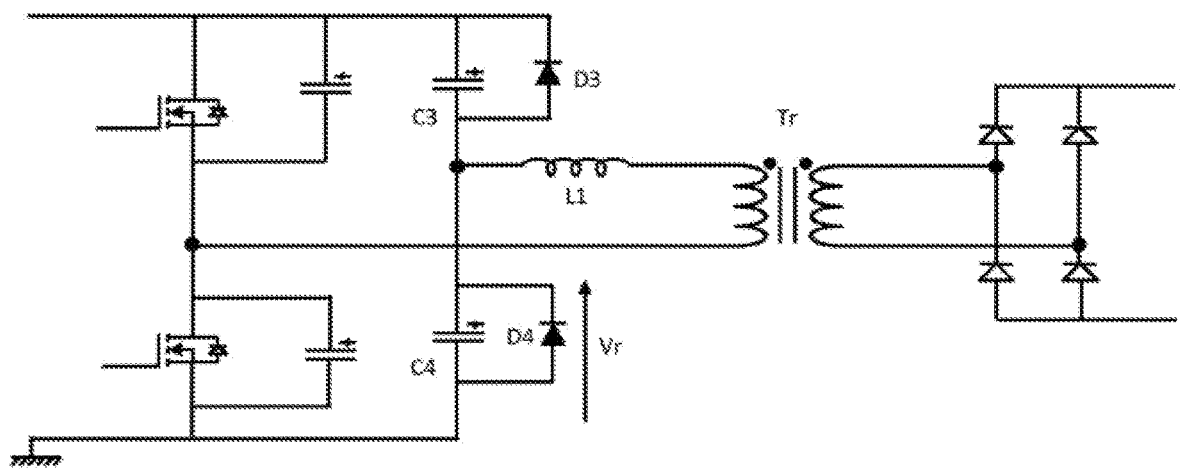
FIG. 3 (already described)
Figure 4:
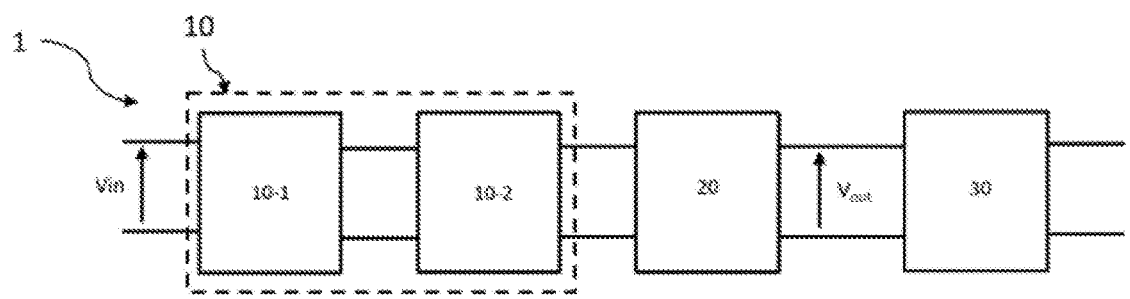
FIG. 4.

FIG. 4 represents a functional block diagram of an embodiment of an electrical system configured to be mounted in an electric or hybrid automobile vehicle. Notably, the electrical system forms an electric charger OBC, known to those skilled in the art and notably on board a vehicle, for charging a high voltage battery from an external electrical network. The invention relates to a resonant DC-DC voltage converter 1.

With reference to FIG. 4, the electrical system comprises a resonant DC-DC voltage converter 1, comprising a converter circuit 10, a rectifier 20, connected to the output of said converter circuit 10, and a filter 30, connected to the output of said rectifier 20. The filter 30 may be omitted. The resonant DC-DC voltage converter 1 makes it possible to convert a direct current voltage into another direct current voltage, the detailed topology of this resonant DC-DC voltage converter 1 will be described in detail in a next section. The converter circuit 10, comprises a first circuit 10-1 and a second circuit 10-2, notably making it possible to obtain a square wave AC voltage, in other words a sinusoidal current, from a direct current voltage. The rectifier 20 makes it possible to convert a square wave AC voltage into a pulsed rectified voltage, that is to say a variable voltage but of constant sign. The filter 30 makes it possible to "smooth out" the voltage obtained previously, that is to say to obtain at the output of the filter 30 the average value of the input voltage of the filter 30.

Figure 5:
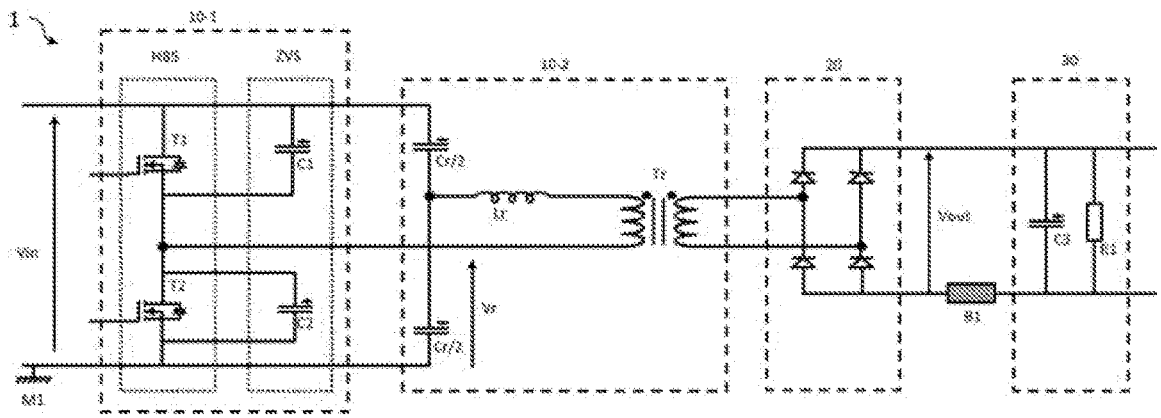
FIG. 5.

FIG. 5 represents the detailed topology of the electrical system shown in FIG. 4, that is to say of a resonant DC-DC voltage converter 1. In this detailed embodiment, the first circuit 10-1 of the converter circuit 10 of the resonant DC-DC voltage converter 1 comprises a so-called HBS (half bridge switch) circuit. Furthermore, the second circuit 10-2 of the converter circuit 10, connected to the first circuit 10-1, comprises a resonant converter circuit LLC, of which the structure is known to those skilled in the art.

The HBS circuit comprises two transistors T1 and T2, notably field effect transistors, and ensures a switched-mode power supply, thanks to the transistors T1, T2 operating in switch mode. Losses may occur during the activation and the deactivation of each transistor T1, T2. Capacitors C1, C2 may be connected respectively in parallel with the transistors T1, T2 to enable zero voltage switching (ZVS), and to minimise losses due to switching and thus to obtain a higher switching frequency for the transistors T1 and T2. Still with reference to FIG. 5, the resonant converter LLC of the second circuit 10-2, comprises a resonant inductor $L_r$, two resonant capacitors Cr/2, of which a first capacitor is connected with an upper terminal of the first circuit 10-1 and a second capacitor is connected to a lower terminal of the first circuit 10-1, the two resonant capacitors Cr/2 being connected to their other terminal at the level of a mid-point, and a transformer Tr, which has a magnetising inductor on the primary.

The rectifier 20 may be a four diode bridge enabling voltage rectification. Indeed, a square wave AC voltage, passing from positive to negative, is rectified into a periodic voltage of constant sign, either positive, or negative.

Furthermore, still with reference to FIG. 5, the filter 30 may comprise a resistance R1 and a capacitor C3 mounted in parallel, or simply a capacitor mounted in parallel with the rectifier 20 or instead a filter LC. When the input voltage of the filter 30, corresponding to the output voltage of the rectifier 20, increases, the capacitor C3 charges. Then, when the input voltage of the filter 30 decreases, the capacitor C3 discharges. But, in a known manner, a capacitor charges and discharges "slowly" and thus the amplitude of the voltage delivered at the output of the filter 30 is much lower than that of the input voltage of the filter 30, or even almost zero. Thus, the voltage at the output of the filter 30 is virtually continuous.

Furthermore, in order to detect a potential overcharge of a resonant capacitor Cr/2, the electrical system comprises a control unit TN. The control unit TN is notably a digital processing device and comprises a first determination module TN1, a second determination module TN2, a comparison module TNC and a failure detection element UP. The failure detection element UP may be a unit for driving the transistors, commonly called "driver" by those skilled in the art.

Figure 6:
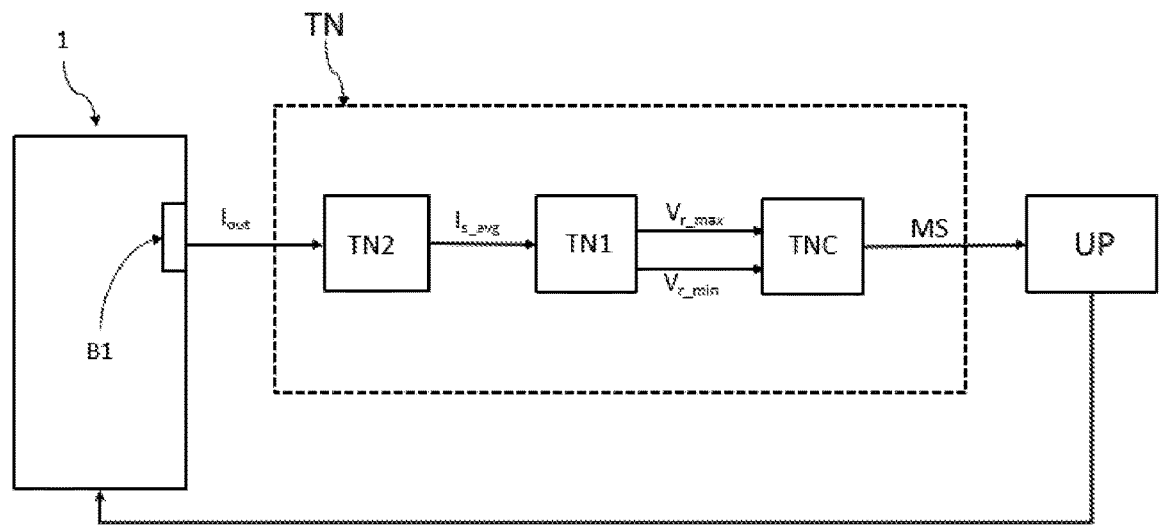
FIG. 6.

With reference to FIG. 6, an embodiment of the method for detecting overcharging of a resonant DC-DC voltage converter 1 is represented. According to this method, a limitation of the voltage Vr is carried out at the terminals of each resonant capacitor Cr/2.

The second determination module TN2 is connected to a measurement point B1 taken at the output of the resonant DC-DC voltage converter 1, notably at the output of the rectifier 20, in order to measure the output current $I_{out}$. The second determination module TN2 is configured to determine the average value $I_{s\_avg}$ of the output current $I_{out}$ measured and to send the average value $I_{s\_avg}$ thus determined to the first determination module TN1.

The first determination module TN1 is connected to the second determination module TN2 and receives from said second determination module TN2 the determined average value $I_{s\_avg}$ of the output current $I_{out}$.

In particular, the first determination module TN1 is configured to determine the maximum voltage value $V_{r\_max}$ at the terminals of each resonant capacitor Cr/2 and the minimum voltage value $V_{r\_min}$ at the terminals of each resonant capacitor Cr/2 from the input voltage $V_{in}$ of the resonant DC-DC voltage converter 1, the average value $I_{s\_avg}$ received from the output current $I_{out}$, the switching frequency $F_s$ of the resonant DC-DC voltage converter 1, the value of the resonant capacitors Cr/2, the value of the output voltage $V_{out}$ of the resonant DC-DC voltage converter 1, notably of the rectifier 20, the transformation ratio N of the transformer Tr and the primary magnetising inductor $L_m$ of the transformer Tr.

Notably, the maximum voltage value $V_{r\_max}$ at the terminals of each resonant capacitor Cr/2 is determined according to the formula:

$$V_{r\_max} = \frac{1}{2}V_{in} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 9]

Furthermore, the minimum voltage value $V_{r\_min}$ at the terminals of each resonant capacitor Cr/2 is determined according to the formula:

$$V_{r\_min} = \frac{1}{2}V_{in} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$ [Math. 10]

where: $V_{in}$ is the input voltage of the resonant DC-DC voltage converter 1,
$C_r$ is the value of the resonant capacitors Cr/2,
$F_s$ is the switching frequency of the resonant DC-DC voltage converter 1,
N designates the transformation ratio of the transformer Tr,
$I_{s\_avg}$ is the average value of the output current $I_{out}$,
$V_{out}$ is the output voltage of the resonant DC-DC voltage converter 1, notably of the rectifier 20 and
$L_m$ designates the primary magnetising inductor of the transformer Tr.

Comparison Between a Minimum Voltage Value $V_{r\_min}$ at the Terminals of the Resonant Capacitor Cr/2 and a Lower Voltage Limit $Vr_{limit\_min}$ and Comparison Between a Maximum Voltage Value $V_{r\_max}$ at the Terminals of the Resonant Capacitor Cr/2 and an Upper Voltage Limit $V_{rlimit\_max}$.

The comparison module TNC of the control unit TN is connected to the first determination module TN1 and receives from said first determination module TN1 the maximum voltage value $V_{r\_max}$ at the terminals of each resonant capacitor Cr/2 and the minimum voltage value $V_{r\_min}$ at the terminals of each resonant capacitor Cr/2.

The comparison module TNC makes the comparison on the one hand between the maximum voltage value $V_{r\_max}$ at the terminals of each resonant capacitor Cr/2 and an upper voltage limit $Vr_{limit\_max}$, and on the other hand between the minimum voltage value $V_{r\_min}$ at the terminals of each resonant capacitor Cr/2 and a lower voltage limit $Vr_{limit\_min}$.

Figure 9:
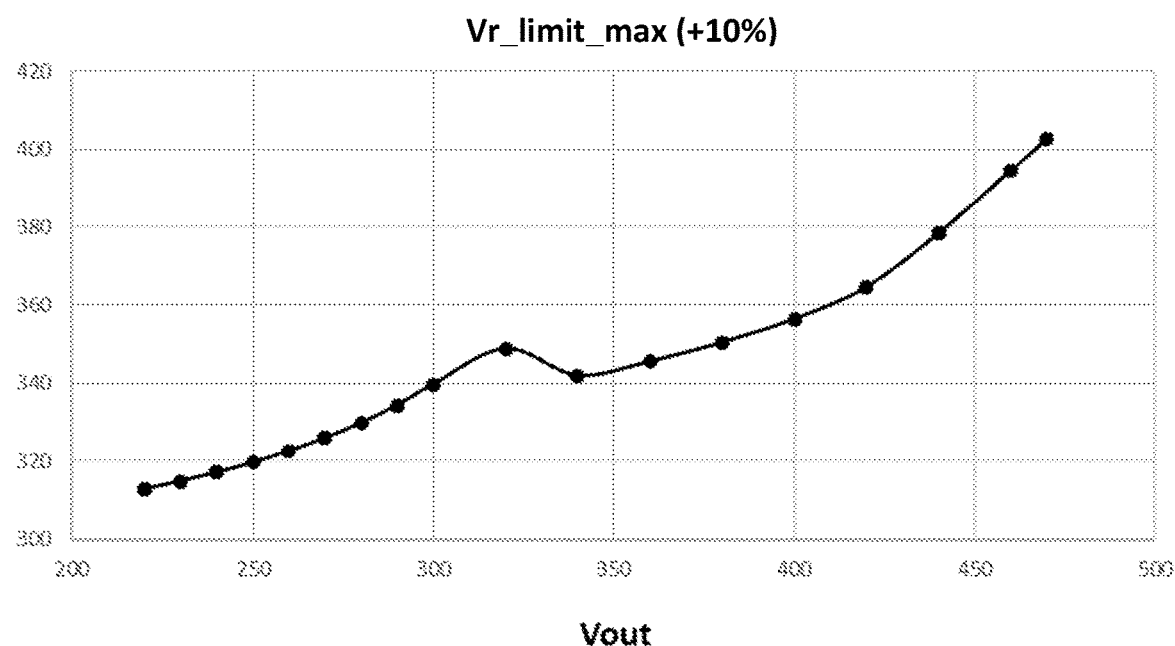
FIG. 9.

The upper voltage limit $Vr_{limit\_max}$ is notably a value stored in a memory unit of the control unit TN. The upper voltage limit $Vr_{limit\_max}$ is for example selected from a set of upper voltage limit values $Vr_{limit\_max}$ as a function of the output voltage $V_{out}$ of the resonant DC-DC voltage converter 1, notably at the output of the rectifier 20. FIG. 9 illustrates an example of such a set of upper voltage limit values $Vr_{limit\_max}$. Such a selection is for example carried out in real time.

Figure 11:
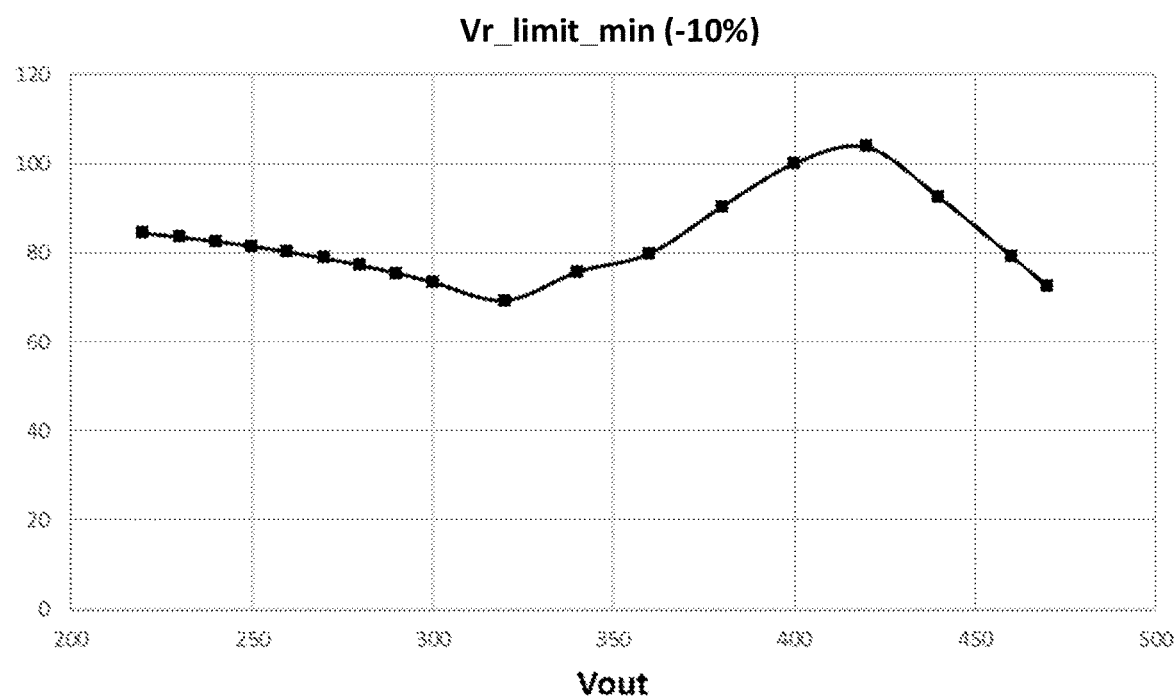
FIG. 11.

On the other hand, the lower voltage limit $Vr_{limit\_min}$ is notably a value stored in a memory unit of the control unit TN, being able to be the memory unit wherein is stored the upper voltage limit value $Vr_{limit\_max}$ or any other memory unit. The lower voltage limit $Vr_{limit\_min}$ is for example selected from a set of lower voltage limit values $Vr_{limit\_min}$ as a function of the output voltage $V_{out}$ at the output of the resonant DC-DC voltage converter 1, notably at the output of the rectifier 20. FIG. 11 illustrates an example of such a set of lower voltage limit values $Vr_{limit\_min}$. Such a selection is for example carried out in real time.

Thus, when the maximum voltage value $V_{r\_max}$ at the terminals of each resonant capacitor Cr/2 is greater than the upper voltage limit $Vr_{limit\_max}$ and/or when the minimum voltage value $V_{r\_min}$ at the terminals of each resonant capacitor Cr/2 is less than the lower voltage limit $Vr_{limit\_min}$, this signifies that the resonant capacitor Cr/2 is in overcharge. Thus, the detection of a failure of the resonant DC-DC voltage converter 1 is carried out.

Still with reference to FIG. 6, according to an alternative, when there is detection of a failure, a step of cut-off of the resonant DC-DC voltage converter 1 follows, which stops the operation of the resonant DC-DC voltage converter 1. To do so, the failure detection element UP comprises a cut-off element configured to stop the operation of the resonant DC-DC voltage converter 1 in the event of failure. For example, the comparison module TNC sends a stop message MS to the cut-off element of the failure detection element UP of the resonant DC-DC voltage converter 1. The cut-off element receives said stop message MS, containing a stop command. After reception of this stop message MS, the cut-off element stops the operation of the resonant DC-DC voltage converter 1, thus protecting the resonant DC-DC voltage converter 1 from deterioration of its components, said deterioration being due to an overcharge. The cut-off element comprises for example a relay connected between the resonant DC-DC voltage converter 1 and an electrical network.

A possible alternative to the step of cut-off of the resonant DC-DC voltage converter 1 consists in a step wherein the failure detection element UP could impose on the resonant DC-DC voltage converter 1 to operate in degraded mode without imposing a complete stoppage of the resonant DC-DC voltage converter 1.

Determination of the Set of Upper Voltage Limit Values $Vr_{limit\_max}$ and the Set of lower voltage limit values $Vr_{limit\_min}$.

The set of upper voltage limit values $Vr_{limit\_max}$ and the set of lower voltage limit values $Vr_{limit\_min}$ are for example determined in a preliminary phase, and notably in a preliminary phase of calibration of the resonant DC-DC voltage converter 1. Such a preliminary calibration phase may be done just once or regularly over the lifetime of the resonant DC-DC voltage converter 1. An example of determination of the set of upper voltage limit values $Vr_{limit\_max}$ and the set of lower voltage limit values $Vr_{limit\_min}$ will now be described in the following paragraphs.

Step 1: Determination of the Input Voltage $V_{in}$

TABLE 1

| $V_{in(nom)}$ V | $V_{out}$ V | $I_{out}$ A | $P_{out(max)}$ W | $F_s$ Hz |
|---|---|---|---|---|
| 370.00 | 220 | 12.00 | 2640 | 1.8511.10⁵ |
| 370.00 | 230 | 12.00 | 2760 | 1.8214.10⁵ |
| 370.00 | 240 | 12.00 | 2880 | 1.7898.10⁵ |
| 370.00 | 250 | 12.00 | 3000 | 1.7564.10⁵ |
| 370.00 | 260 | 12.00 | 3120 | 1.7208.10⁵ |
| 370.00 | 270 | 12.00 | 3240 | 1.6832.10⁵ |
| 370.00 | 280 | 12.00 | 3360 | 1.6431.10⁵ |
| 370.00 | 290 | 12.00 | 3480 | 1.6006.10⁵ |
| 370.00 | 300 | 12.00 | 3600 | 1.5554.10⁵ |
| 370.00 | 320 | 12.00 | 3600 | 1.4743.10⁵ |
| 370.00 | 340 | 10.59 | 3600 | 1.3597.10⁵ |
| 378.40 | 360 | 10.00 | 3600 | 1.2768.10⁵ |
| 395.60 | 380 | 9.47 | 3600 | 1.2533.10⁵ |
| 412.80 | 400 | 9.00 | 3600 | 1.2283.10⁵ |
| 425.00 | 420 | 8.57 | 3600 | 1.1644.10⁵ |
| 425.00 | 440 | 8.18 | 3600 | 1.0238.10⁵ |
| 425.00 | 460 | 7.83 | 3600 | 9.1886.10⁵ |
| 425.00 | 470 | 7.66 | 3600 | 8.7851.10⁵ |

Figure 7:
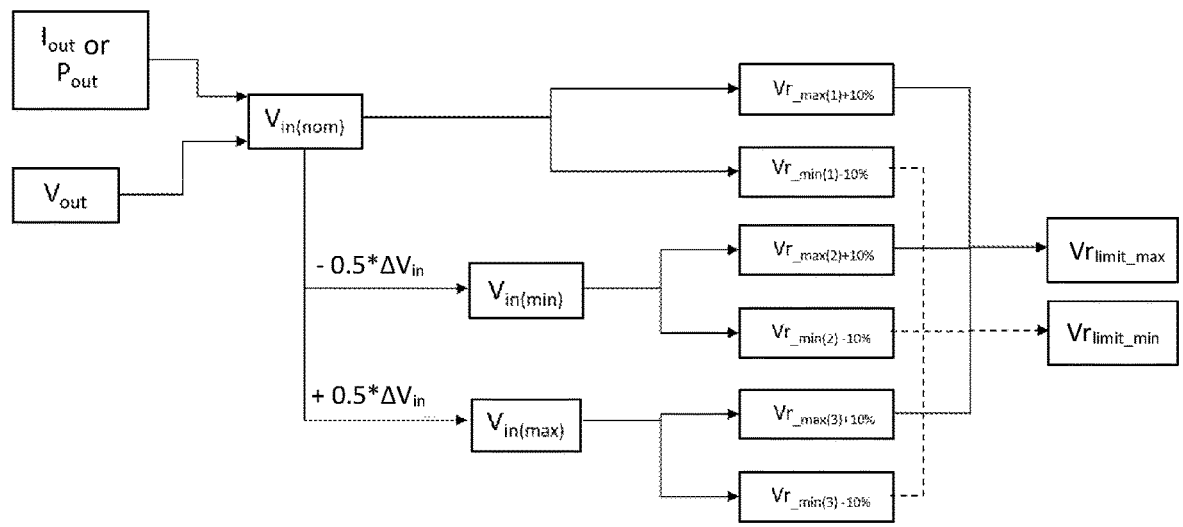
FIG. 7.

Firstly, with reference to the preceding table and to FIG. 7, a set of usual output voltages $V_{out}$ of the resonant DC-DC voltage converter 1 is considered, corresponding to different possible voltages notably making it possible to supply a battery connected to the output of the resonant DC-DC voltage converter 1. For example, a set of usual output voltage values $V_{out}$ is considered with a step of 10 or 20 V between two successive output voltage values $V_{out}$. In the same way, a set of usual output current values $I_{out}$ is considered for this type of resonant DC-DC voltage converter 1.

In addition, a relationship exists between the nominal value $V_{in(nom)}$ of the input voltage $V_{in}$ of the resonant DC-DC voltage converter 1, the output voltage value $V_{out}$ and the output current value $I_{out}$. This relation is, according to an embodiment, defined according to the following formula:

$$V_{in(nom)} = 0.86 \times V_{out} + 58.8 + \frac{P_{out}}{360} \quad \text{[Math. 11]}$$

with $P_{out}$ defined as the output power and $P_{out} = V_{out} \times I_{out}$.

Thus, for each usual value of the output voltage $V_{out}$, and for each usual value of the output current $I_{out}$, a nominal value $V_{in(nom)}$ of the input voltage $V_{in}$ is determined.

Then, a set of values is determined of the variation $\Delta V_{in}$ representing the undulation around the nominal value $V_{in(nom)}$ of the input voltage $V_{in}$ (or in other words the difference between the nominal minimum value $V_{in(min)}$ and the nominal maximum value $V_{in(max)}$ of the input voltage). The variation $\Delta V_{in}$ is determined thanks to the following known formula:

$$\Delta V_{in} = \frac{P_{out}}{(C \cdot 2\Pi \cdot F_{line} \cdot V_{in(nom)})} \quad \text{[Math. 12]}$$

where: $P_{out}$ is the output power of the resonant DC-DC voltage converter 1, $V_{in(nom)}$ is the nominal value of the input voltage of the resonant DC-DC voltage converter 1, C is the value of the input capacitor of the resonant DC-DC voltage converter 1, $F_{line}$ is the line frequency, that is to say of the electrical network to which the electrical system is connected at the input.

A set of minimum nominal values $V_{in(min)}$ of the input voltage $V_{in}$ and a set of maximum nominal values $V_{in(max)}$ of the input voltage $V_{in}$ are then determined from the set of values $V_{in(nom)}$ of the input voltage $V_{in}$, each value of said sets depending on the usual value of the output voltage $V_{out}$, as a function of the variation $\Delta V_{in}$.

Thus, $V_{in(min)} = V_{in(nom)} - 0.5*\Delta V_{in}$ and $V_{in(max)} = V_{in(nom)} + 0.5*\Delta V_{in}$.

Step 2: Establishment of 3 Scenarios for Determining the Set of Upper Voltage Limit values $Vr_{limit\_max}$ and the set of lower voltage limit values $Vr_{limit\_min}$.

Next first, second and third sets of high voltage values $Vr_{\_max(1)}$, $Vr_{\_max(2)}$ and $Vr_{\_max(3)}$ are determined at the terminals of the two resonant capacitors Cr/2, respectively first, second and third sets of low voltage values $Vr_{\_min(1)}$, $Vr_{\_min(2)}$ and $Vr_{\_min(3)}$ at the terminals of the two resonant capacitors Cr/2 for respectively a set of nominal values $V_{in(nom)}$, a set of minimum nominal values $V_{in(min)}$ and a set of maximum nominal values $V_{in(max)}$. The principle of determining the three possibilities of lower voltage limit values $Vr_{limit\_min}$ and upper voltage limit value $Vr_{limit\_max}$ is represented schematically in FIG. 7.

First Set:

Firstly, the first set of high voltage values $Vr_{-max(1)}$ is determined notably from the set of nominal values $V_{in(nom)}$ of the input voltage $V_{in}$. Indeed, in the present case, the first set of high voltage values $Vr_{-max(1)}$ is defined for example according to the formula corresponding to equation [Math. 9] developed previously, with $V_{in}=V_{in(nom)}$.

Similarly, the first set of low voltage values $Vr_{-min(1)}$ is determined notably from the set of nominal values $V_{in(nom)}$ of the input voltage $V_{in}$. Indeed, in the present case, the first set of low voltage values $Vr_{-min(1)}$ is defined according to the formula corresponding to equation [Math. 10] developed previously, with $V_{in}=V_{in(nom)}$.

TABLE 2

| Vout | Vin (nom) | Vr_min (1) | Vr_min (1)-10% | Vr_max (1) | Vr_max(1) + 10% |
|---|---|---|---|---|---|
| V | V | V | V | V | V |
| 220 | 370 | 80.7 | 72.63 | 289.3 | 318.23 |
| 230 | 370 | 78.94 | 71.046 | 291.06 | 320.166 |
| 240 | 370 | 77.01 | 69.309 | 292.99 | 322.289 |
| 250 | 370 | 74.88 | 67.392 | 295.12 | 324.632 |
| 260 | 370 | 72.53 | 65.277 | 297.47 | 327.217 |
| 270 | 370 | 69.92 | 62.928 | 300.08 | 330.088 |
| 280 | 370 | 67.01 | 60.309 | 302.99 | 333.289 |
| 290 | 370 | 63.75 | 57.375 | 306.25 | 336.875 |
| 300 | 370 | 60.07 | 54.063 | 309.93 | 340.923 |
| 320 | 370 | 52.83 | 47.547 | 317.17 | 348.887 |
| 340 | 370 | 57.4 | 51.66 | 312.6 | 343.86 |
| 360 | 378.4 | 59.69 | 53.721 | 318.71 | 350.581 |
| 380 | 395.6 | 71.71 | 64.539 | 323.89 | 356.279 |
| 400 | 412.8 | 82.88 | 74.592 | 329.92 | 362.912 |
| 420 | 425 | 86.32 | 77.688 | 338.89 | 372.779 |
| 440 | 425 | 70.78 | 63.702 | 354.22 | 389.642 |
| 460 | 425 | 54.9 | 49.41 | 370.1 | 407.11 |
| 470 | 425 | 47.34 | 42.606 | 377.66 | 415.426 |

The first set of high voltage values $Vr_{-max(1)}$ and the first set of corresponding low voltage values $Vr_{-min(1)}$ are listed in table 2 above. A first set of low voltage values $Vr_{-min(1)-10\%}$ with a tolerance margin of 10% (less) and a first set of high voltage values $Vr_{-max(1)+10\%}$ with a tolerance margin of 10% (more) are also represented. The tolerance margin is optional and may take another value, for example a value comprised between 8 and 12%.

Second Set:

The second set of high voltage values $Vr_{-max(2)}$ is determined notably from the set of minimum nominal values $V_{in(min)}$ of the input voltage $V_{in}$. Indeed, in the present case, the second set of high voltage values $Vr_{-max(2)}$ is defined according to the formula corresponding to equation [Math. 9] developed previously, with $V_{in}=V_{in(min)}$.

Similarly, the second set of low voltage values $Vr_{-min(2)}$ is determined notably from the set of minimum nominal values $V_{in(min)}$ of the input voltage $V_{in}$. Indeed, in the present case, the second set of low voltage values $Vr_{-min(2)}$ is defined according to the formula corresponding to equation [Math. 10] developed previously, with $V_{in}=V_{in(min)}$.

TABLE 3

| Vout | Vin (min) | Vr_min (2) | Vr_min(2)- 10% | Vr_max (2) | Vr_max(2) + 10% |
|---|---|---|---|---|---|
| V | V | V | V | V | V |
| 220 | 351.67 | 67.26 | 60.534 | 284.4 | 312.84 |
| 230 | 350.83 | 64.63 | 58.167 | 286.21 | 314.831 |
| 240 | 350 | 61.75 | 55.575 | 288.25 | 317.075 |

TABLE 3-continued

| Vout | Vin (min) | Vr_min (2) | Vr_min(2)- 10% | Vr_max (2) | Vr_max(2) + 10% |
|---|---|---|---|---|---|
| V | V | V | V | V | V |
| 250 | 349.17 | 58.58 | 52.722 | 290.58 | 319.638 |
| 260 | 348.33 | 55.09 | 49.581 | 293.25 | 322.575 |
| 270 | 347.5 | 51.2 | 46.08 | 296.3 | 325.93 |
| 280 | 346.67 | 46.83 | 42.147 | 299.84 | 329.824 |
| 290 | 345.83 | 41.87 | 37.683 | 303.96 | 334.356 |
| 300 | 345 | 36.17 | 32.553 | 308.83 | 339.713 |
| 320 | 345 | 24.48 | 22.032 | 320.52 | 352.572 |
| 340 | 345 | 23.2 | 20.88 | 321.8 | 353.98 |
| 360 | 353.95 | 20.64 | 18.576 | 333.31 | 366.641 |
| 380 | 372.22 | 34.82 | 31.338 | 337.4 | 371.14 |
| 400 | 390.39 | 48.25 | 43.425 | 342.14 | 376.354 |
| 420 | 403.24 | 52.26 | 47.034 | 350.98 | 386.078 |
| 440 | 403.24 | 34.81 | 31.329 | 368.42 | 405.262 |
| 460 | 403.24 | 19.01 | 17.109 | 384.23 | 422.653 |
| 470 | 403.24 | 11.86 | 10.674 | 391.38 | 430.518 |

The second set of high voltage values $Vr_{-max(2)}$ and the second set of corresponding low voltage values $Vr_{-min(2)}$ are listed in table 3 above. A second set of low voltage values $Vr_{-min(2)-10\%}$ with a tolerance margin of 10% (less) and a second set of high voltage values $Vr_{-max(2)+10\%}$ with a tolerance margin of 10% (more) are also represented. The tolerance margin is optional and may take another value, for example a value comprised between 8 and 12%.

Third Set:

Finally, the third set of high voltage values $Vr_{-max(3)}$ is notably determined from the set of maximum nominal values $V_{in(max)}$ of the input voltage $V_{in}$. Indeed, in the present case, the third set of high voltage values $Vr_{-max(3)}$ is defined according to the formula corresponding to equation [Math. 9] developed previously, with $V_{in}=V_{in(max)}$.

Similarly, the third set of low voltage values $Vr_{-min(3)}$ is notably determined from the set of maximum nominal values $V_{in(max)}$ of the input voltage $V_{in}$. Indeed, in the present case, the third set of low voltage values $Vr_{-min(3)}$ is defined according to the formula corresponding to equation [Math. 10] developed previously, with $V_{in}=V_{in(max)}$.

TABLE 4

| Vout | Vin (max) | Vr_min (3) | Vr_min(3)- 10% | Vr_max (3) | Vr_max(3) + 10% |
|---|---|---|---|---|---|
| V | V | V | V | V | V |
| 220 | 388.33 | 93.78 | 84.402 | 294.55 | 324.005 |
| 230 | 389.17 | 92.82 | 83.538 | 296.34 | 325.974 |
| 240 | 390 | 91.74 | 82.566 | 298.26 | 328.086 |
| 250 | 390.83 | 90.54 | 81.486 | 300.32 | 330.352 |
| 260 | 391.67 | 89.14 | 80.226 | 302.53 | 332.783 |
| 270 | 392.5 | 87.58 | 78.822 | 304.92 | 335.412 |
| 280 | 393.33 | 85.82 | 77.238 | 307.51 | 338.261 |
| 290 | 394.17 | 83.84 | 75.456 | 310.32 | 341.352 |
| 300 | 395 | 81.61 | 73.449 | 313.39 | 344.729 |
| 320 | 395 | 77 | 69.3 | 318 | 349.8 |
| 340 | 395 | 84.11 | 75.699 | 310.89 | 341.979 |
| 360 | 402.85 | 88.69 | 79.821 | 314.16 | 345.576 |
| 380 | 418.98 | 100.4 | 90.36 | 318.58 | 350.438 |
| 400 | 435.21 | 111.14 | 100.026 | 324.07 | 356.477 |
| 420 | 446.76 | 115.3 | 103.77 | 331.46 | 364.606 |
| 440 | 446.76 | 102.78 | 92.502 | 343.99 | 378.389 |
| 460 | 446.76 | 88.04 | 79.236 | 358.73 | 394.603 |
| 470 | 446.76 | 80.5 | 72.45 | 366.26 | 402.886 |

The third set of high voltage values $Vr_{-max(3)}$ and the third set of corresponding low voltage values $Vr_{-min(3)}$ are listed in table 4 above. A third set of low voltage values $Vr_{-min(3)-10\%}$ with a tolerance margin of 10% (less) and a third set of high voltage values $Vr_{\_max(3)+10\%}$ with a tolerance margin of 10% (more) are also represented. The tolerance margin is optional and may take another value, for example a value comprised between 8 and 12%.

Figure 8:
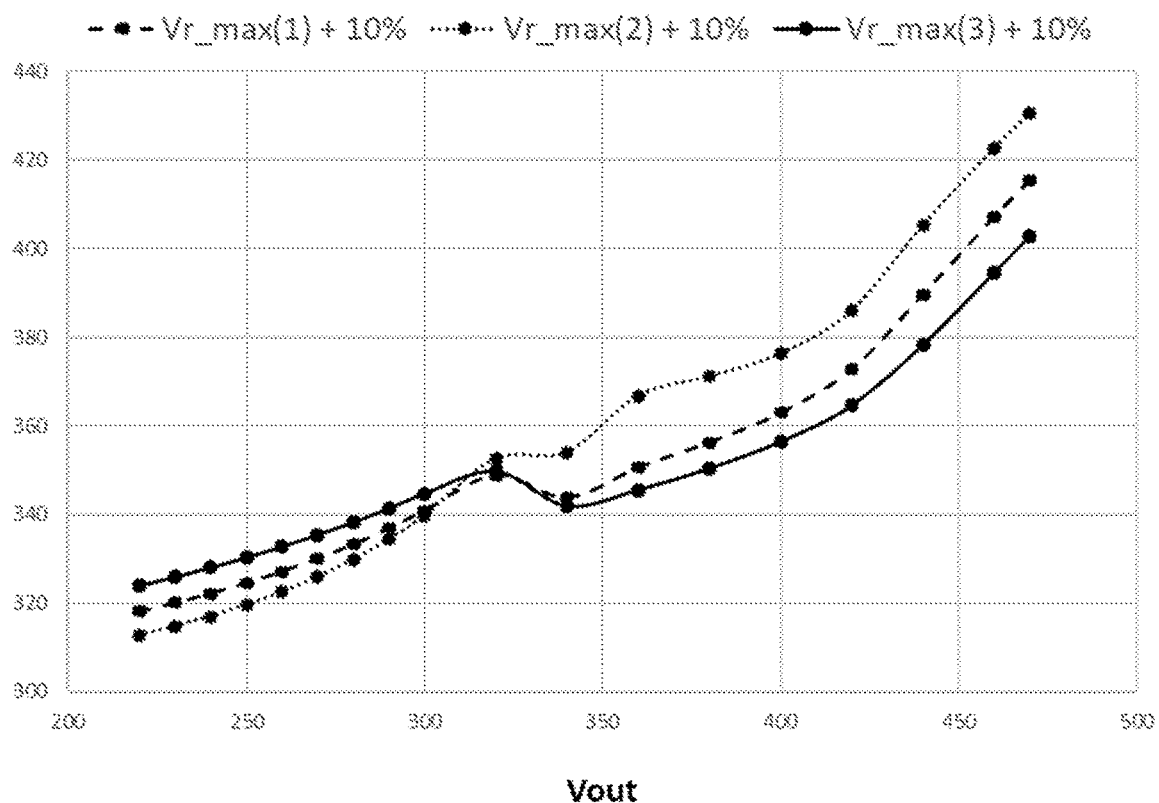
FIG. 8.

Step 3: Choice of the Set of Lower Voltage Limit Values $Vr_{limit\_min}$ and Choice of the set of upper voltage limit values $Vr_{limit\_max}$ Next, the set of upper voltage limit values $Vr_{limit\_max}$ is determined from the first, second and third sets of high voltage values $Vr_{\_max(1)+10\%}$, $Vr_{\_max(2)+10\%}$ and $Vr_{\_max(3)+10\%}$, preferably with a tolerance margin, said first, second and third sets of high voltage values $Vr_{\_max(1)+10\%}$, $Vr_{\_max(2)+10\%}$ and $Vr_{\_max(3)+10\%}$ being represented as a function of the output voltage $V_{out}$ in FIG. 8. To do so, the first, second and third sets of high voltage values $Vr_{\_max(1)+10\%}$, $Vr_{\_max(2)+10\%}$ and $Vr_{\_max(3)+10\%}$ are compared point by point, preferably with the tolerance margin. In other words, the values of the first, second and third sets of high voltage values $Vr_{\_max(1)+10\%}$, $Vr_{\_max(2)+10\%}$ and $Vr_{\_max(3)+10\%}$ are compared with each other for each output voltage value $V_{out}$ and the minimum value is selected from among the values of the first, second and third sets of high voltage values $Vr_{\_max(1)+10\%}$, $Vr_{\_max(2)+10\%}$ and $Vr_{\_max(3)+10\%}$ for each usual output voltage value $V_{out}$. Finally, the set of upper voltage limit values $Vr_{limit\_max}$ is constituted of the set of minimum selected values. Said set of upper voltage limit values $Vr_{limit\_max}$ is represented graphically in FIG. 9.

Figure 10:
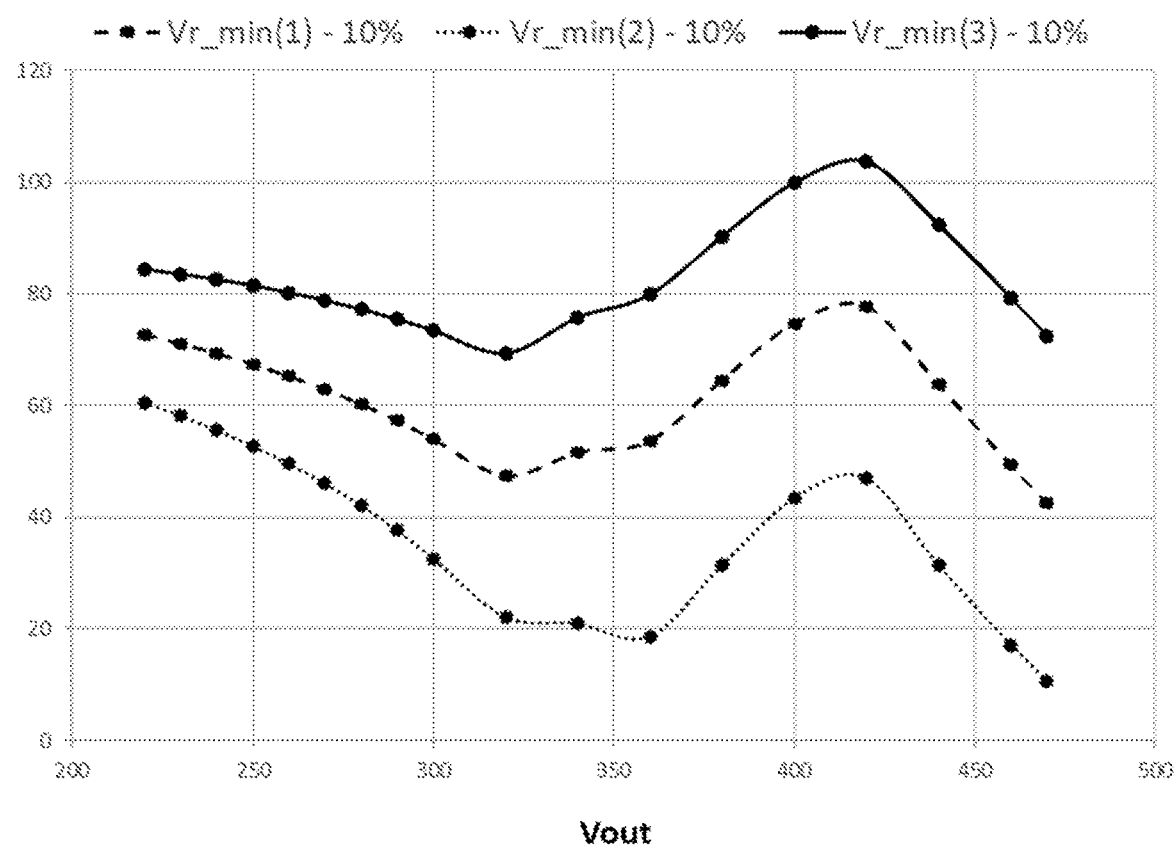
FIG. 10.

Similarly, the set of lower voltage limit values $Vr_{limit\_min}$ is determined from the first, second and third sets of low voltage values $Vr_{\_min(1)-10\%}$, $Vr_{\_min(2)-10\%}$ and $Vr_{\_min(3)-10\%}$, preferably with the tolerance margin, said first, second and third sets of low voltage values $Vr_{\_min(1)-10\%}$, $Vr_{\_min(2)-10\%}$ and $Vr_{\_min(3)-10\%}$ being represented as a function of the output voltage $V_{out}$ in FIG. 10. To do so, the first, second and third sets of low voltage values $Vr_{\_min(1)-10\%}$, $Vr_{\_min(2)-10\%}$ and $Vr_{\_min(3)}-10\%$ are compared point by point preferably with the tolerance margin. In other words, the values of the first, second and third sets of low voltage values $Vr_{\_min(1)-10\%}$, $Vr_{\_min(2)-10\%}$ and $Vr_{\_min(3)-10\%}$ are compared with each other for each output voltage value $V_{out}$ and the maximum value is selected from among the values of the first, second and third sets of high voltage values $Vr_{\_min(1)-10\%}$, $Vr_{\_min(2)-10\%}$ and $Vr_{\_min(3)-10\%}$ for each usual output voltage value $V_{out}$. Finally, the set of lower voltage limit values $Vr_{limit\_min}$ is constituted of the set of selected maximum values. Said set of lower voltage limit values $Vr_{limit\_min}$ is represented graphically in FIG. 11.

According to an alternative, the set of upper voltage limit values $Vr_{limit\_max}$ is directly determined by comparison between the first, second and third sets of high voltage values $Vr_{\_max(1)}$, $Vr_{\_max(2)}$ and $Vr_{\_max(3)}$, without tolerance margin. The set of lower voltage limit values $Vr_{limit\_min}$ is then, for its part, directly determined by comparison between the first, second and third sets of low voltage values $Vr_{\_min(1)}$, $Vr_{\_min(2)}$ and $Vr_{\_min(3)}$, without tolerance margin.

In another alternative, when the selection of the set of upper voltage limit values $Vr_{limit\_max}$ and the set of lower voltage limit values $Vr_{limit\_min}$ has been carried out, a first continuous function, extrapolated from the evolution of the upper voltage limit $Vr_{limit\_max}$ as a function of the output voltage $V_{out}$, and a second continuous function, extrapolated from the evolution of the lower voltage limit $Vr_{limit\_min}$ as a function of the output voltage $V_{out}$, are generated. Thus, there are no longer only discrete values, but a continuous curve of high voltage limit values $Vr_{limit\_max}$ and a continuous curve of low voltage limit values $Vr_{limit\_min}$ as a function of the output voltage $V_{out}$.

Finally, the first extrapolated continuous function and the second extrapolated continuous function may be memorised in a memory unit of the control unit TN.

The invention claimed is:

1. An electrical system enabling a conversion of a direct current voltage into another direct current voltage, comprising:
a resonant DC-DC voltage converter comprising a resonant converter circuit (LLC) comprising a resonant inductor, two resonant capacitors and a transformer,
a control unit comprising:
a first module for determining a maximum voltage value at terminals of each resonant capacitor and a minimum voltage value at the terminals of each resonant capacitor as a function of an output voltage of the resonant DC-DC voltage converter,
a module for comparing between said maximum voltage value at the terminals of each resonant capacitor and an upper voltage limit corresponding to said output voltage and between said minimum voltage value at the terminals of each resonant capacitor and a lower voltage limit corresponding to said output voltage,
a failure detection element configured to detect a failure of the resonant DC-DC voltage converter if:
said maximum voltage value at the terminals of each resonant capacitor is greater than or equal to the upper voltage limit, or
said minimum voltage value at the terminals of each resonant capacitor is less than or equal to the lower voltage limit.

2. The electrical system according to claim 1, wherein the resonant DC-DC voltage converter comprises a rectifier connected at a level of the secondary of the transformer.

3. The electrical system according to claim 2, wherein a second determination module is configured to determine an average value of the output current from a measurement point situated at an output terminal of the rectifier.

4. The electrical system according to claim 1, wherein the first module is configured to determine the maximum voltage value at the terminals of each resonant capacitor and the minimum voltage value at the terminals of each resonant capacitor from an input voltage of the resonant DC-DC voltage converter, an average value of the output current, a switching frequency of the resonant DC-DC voltage converter, a value of the resonant capacitors, a value of the output voltage of the rectifier, a transformation ratio of the transformer, and a primary magnetising inductor of the transformer.

5. The electrical system according to claim 4, wherein the first determination module is configured to:
determine the maximum voltage value at the terminals of each resonant capacitor according to the formula:

$$V_{r\_max} = \frac{1}{2}V_{in} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

and to determine the minimum voltage value at the terminals of each resonant capacitor according to the formula:

$$V_{r\_min} = \frac{1}{2}V_{in} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

where $V_{in}$ is the input voltage of the resonant DC-DC voltage converter, $C_r$ is the value of the resonant capacitors, $F_s$ is the switching frequency of the resonant DC-DC voltage converter, N designates the transformation ratio of the transformer, $I_{s\_avg}$ is the average value of the output current, $V_{out}$ is the output voltage and $L_m$ designates the primary magnetising inductor of the transformer.

6. The electrical system according to claim 1, wherein a comparison module is configured such that:
said upper voltage limit corresponds to a maximum voltage value allowed at the terminals of each resonant capacitor, above which said capacitor is in overcharge, and
said lower voltage limit corresponds to a minimum voltage value allowed at the terminals of each resonant capacitor, below which said resonant capacitor is in overcharge.

7. A method for detecting overcharging of a resonant DC-DC voltage converter implemented in an electrical system comprising the resonant DC-DC voltage converter comprising a resonant converter circuit (LLC) which comprises a resonant inductor, two resonant capacitors and a transformer,
said method being characterised in that it comprises steps of:
determination of an output voltage of the resonant DC-DC voltage converter,
determination of a maximum voltage value at the terminals of each resonant capacitor and a minimum voltage value at the terminals of each resonant capacitor as a function of the output voltage of the resonant DC-DC voltage converter,
comparison between an upper voltage limit and the maximum voltage value at the terminals of each resonant capacitor and between a lower voltage limit and the minimum voltage value at the terminals of each resonant capacitor,
detection of a failure of the resonant DC-DC voltage converter if said maximum voltage value at the terminals of each resonant capacitor is greater than or equal to the upper voltage limit, and/or if said minimum voltage value at the terminals of each resonant capacitor is less than or equal to the lower voltage limit.

8. The method according to claim 7, wherein the failure detection step corresponds to the detection of an overcharge of a resonant capacitor.

9. The method according to claim 7, comprising, after the failure detection step, a step of cut-off of the resonant DC-DC voltage converter, wherein the operation of the resonant DC-DC voltage converter is stopped.

10. The method according to claim 7, comprising a preliminary phase of calibration wherein said lower voltage limit, respectively said upper voltage limit, is selected from a set of lower voltage limit values, respectively from a set of upper voltage limit values, as a function of the output voltage value of the resonant DC-DC voltage converter.

11. The method according to claim 10, wherein, during the preliminary phase of calibration, said set of lower voltage limit values is determined by point by point comparison of sets of low voltage values and by selecting a maximum value from among values of the first, second and third sets of low voltage values for each usual output voltage value,
said sets of low voltage values being defined according to the following formula:

$$V_{r\_min(1)} = \frac{1}{2}V_{in(nom)} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

$$V_{r\_min(2)} = \frac{1}{2}V_{in(min)} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

$$V_{r\_min(3)} = \frac{1}{2}V_{in(max)} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

where $V_{in(nom)}$ is the nominal value of the input voltage of the resonant DC-DC voltage converter, $V_{in(min)}=V_{in(nom)}-0.5*\Delta V_{in}$ is the nominal minimum value of the input voltage, $V_{in(max)}=V_{in(nom)}-0.5*\Delta V_{in}$ is the nominal maximum value of the input voltage and $\Delta V_{in}$ represents the undulation around the nominal value of the input voltage,
said set of upper voltage limit values is determined by point by point comparison of sets of high voltage values and by selecting the minimum value from among the values of the first, second and third sets of high voltage values for each usual output voltage value,
said sets of high voltage values being defined according to the following formula:

$$V_{r\_max(1)} = \frac{1}{2}V_{in(nom)} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

$$V_{r\_max(2)} = \frac{1}{2}V_{in(min)} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

$$V_{r\_max(3)} = \frac{1}{2}V_{in(max)} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

\* \* \* \* \*